(12) United States Patent
Stork et al.

(10) Patent No.: US 10,202,016 B2
(45) Date of Patent: Feb. 12, 2019

(54) HEAT-SENSITIVE RECORDING MATERIAL FOR OFFSET PRINTING

(71) Applicant: MITSUBISHI HITEC PAPER EUROPE GMBH, Bielefeld (DE)

(72) Inventors: Gerhard Stork, Flensburg (DE); Nora Wilke, Flensburg (DE)

(73) Assignee: Mitsubishi HiTec Paper Europe GmbH, Bielefeld (DE)

( * ) Notice: Subject to any disclaimer, the term of this patent is extended or adjusted under 35 U.S.C. 154(b) by 0 days.

(21) Appl. No.: 15/538,528

(22) PCT Filed: Jan. 29, 2015

(86) PCT No.: PCT/EP2015/051865
§ 371 (c)(1),
(2) Date: Jun. 21, 2017

(87) PCT Pub. No.: WO2016/102076
PCT Pub. Date: Jun. 30, 2016

(65) Prior Publication Data
US 2018/0001730 A1 Jan. 4, 2018

(30) Foreign Application Priority Data
Dec. 23, 2014 (EP) .................................... 14200247

(51) Int. Cl.
*B41M 5/337* (2006.01)
*B60H 1/00* (2006.01)
(Continued)

(52) U.S. Cl.
CPC ............. *B60H 1/00* (2013.01); *B41M 5/3372* (2013.01); *B60L 11/00* (2013.01); *G06F 3/002* (2013.01);
(Continued)

(58) Field of Classification Search
CPC ................ B41M 5/337; B41M 5/3372; B41M 2205/40; B41M 2205/04
(Continued)

(56) References Cited

U.S. PATENT DOCUMENTS 4,797,385 A 1/1989 Igarashi
4,948,775 A 8/1990 Tsuji et al.
(Continued)

FOREIGN PATENT DOCUMENTS

DE 38 28 731 3/1989
JP 60-64888 4/1985
(Continued)

OTHER PUBLICATIONS

Office Action dated Jul. 10, 2018 issued in Russian Patent Application No. 2017126009/12.
(Continued)

*Primary Examiner* — Bruce H Hess
(74) *Attorney, Agent, or Firm* — Cozen O'Connor

(57) ABSTRACT

A heat-sensitive recording material suitable for offset printing, having a web-shaped substrate, having a front side and a reverse side opposite the front side, a heat-sensitive recording layer disposed at least on one of the two sides of the web-shaped substrate having at least one dye precursor and at least one (color) developer reactive with the dye precursor. The heat-sensitive recording layer has particles including an organic surface whose extent in the direction of the thickness of web-shaped substrate and heat-sensitive recording layer is greater than the thickness of the heat-sensitive recording layer.

18 Claims, 1 Drawing Sheet

List of terms:
(1) web-shaped substrate
(2) interlayer
(3) heat-sensitive recording layer
(4) particle with organic surface

(51) Int. Cl.
*B60L 11/00* (2006.01)
*G06F 3/00* (2006.01)
*B41M 5/327* (2006.01)
*B41M 5/333* (2006.01)

(52) U.S. Cl.
CPC .......... *B41M 5/3275* (2013.01); *B41M 5/337* (2013.01); *B41M 5/3336* (2013.01); *B41M 2205/04* (2013.01)

(58) Field of Classification Search
USPC ...................................................... 503/207
See application file for complete search history.

(56) References Cited

U.S. PATENT DOCUMENTS

| | | | | |
|---|---|---|---|---|
| 5,258,350 | A | * | 11/1993 | Inoue et al. ............. B41M 5/36 503/36 |
| 2008/0058207 | A1 | | 3/2008 | Ohga |
| 2009/0176647 | A1 | | 7/2009 | Hada et al. |

FOREIGN PATENT DOCUMENTS

| | | |
|---|---|---|
| JP | 60-64889 | 4/1985 |
| JP | 62-170386 | 7/1987 |
| JP | 08-187949 | 7/1996 |
| JP | 1995 314 895 | 5/1997 |
| JP | 09-267561 | 10/1997 |
| JP | 2002-283724 | 10/2002 |
| JP | 2003-082594 | 3/2003 |
| JP | 2005-119009 | 5/2005 |
| JP | 2008-055843 | 3/2008 |
| JP | 2010-064421 | 3/2010 |

OTHER PUBLICATIONS

Office Action dated Jul. 17, 2018 issued in Chinese Patent Application No. 201580070294.8.

* cited by examiner

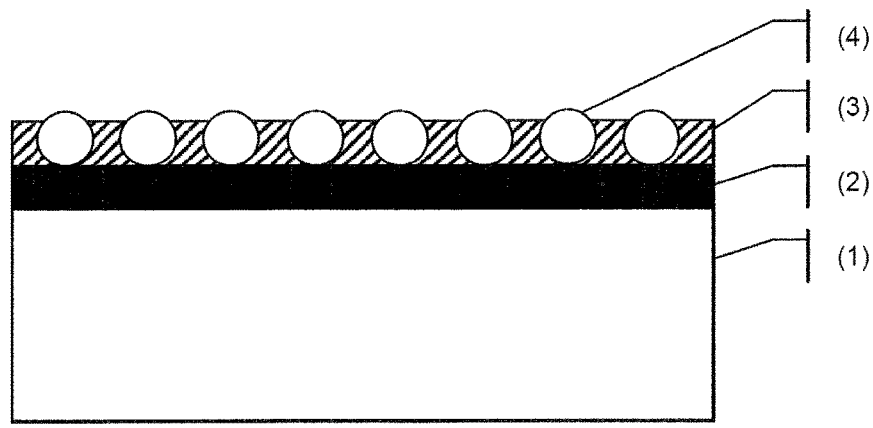
List of terms:
(1) web-shaped substrate
(2) interlayer
(3) heat-sensitive recording layer
(4) particle with organic surface

HEAT-SENSITIVE RECORDING MATERIAL FOR OFFSET PRINTING

CROSS REFERENCE TO RELATED APPLICATIONS

This is a U.S. national stage of application No. PCT/EP2015/051865, filed on Jan. 29, 2015. Priority is claimed on German Application No. EP14200247.6, filed Dec. 23, 2014, the content of which is incorporated here by reference.

BACKGROUND OF THE INVENTION

1. Field of the Invention

The present invention relates to a heat-sensitive recording material having a web-shaped substrate and at least one heat-sensitive recording layer, disposed on at least one of the two sides of the web-shaped substrate, this heat-sensitive recording layer comprising at least one dye precursor and at least one (color) developer that is reactive with this at least one dye precursor. To be reactive with a dye precursor means, in the sense of the present invention in all of its embodiments proposed here, that this at least one (color) developer, on sufficient supply of external heat, undergoes reaction with this at least one dye precursor and, in so doing, develops a visually perceptible printed image.

2. Description of the Related Art

Heat-sensitive recording materials, which give a color-forming reaction in response to a supply of external heat, have been known for many years and have enjoyed a fundamentally uninterrupted popularity, a fact attributable inter alia to the great advantages attaching to their use for the tradesmen issuing tickets, proofs of purchase, and entry cards. Because the color-forming components—that is, dye precursors and (color) developers, also called color acceptors, which react with said precursors on supply of heat, are situated in the recording material itself in the context of a heat-sensitive recording method of this kind, the thermal printers, which are consequently free from toner and ink cartridges, and whose function need no longer be regularly monitored by any one, can be operated in large numbers. Accordingly, this innovative technology has become largely and comprehensively established particularly in public transport and in retail.

A trend in the onward processing of heat-sensitive recording materials is to print them in particular in an offset printing process in order to individualize them, preferably for use as flight tickets and entry cards. Usually and very largely, present-day heat-sensitive recording materials are more or less well suited to such onward processing, instead showing great and presently unresolved problems, if these heat-sensitive recording materials

- have relatively high masses per unit area, something which is frequently the case with entry cards and flight tickets, not least in order to signal a greater value of the entry cards and flight tickets and of the services purchased therewith, and
- to be printed double-sidedly by offset printing.

The reason for the as yet unresolved problems lies mostly in the construction of the offset printing machines, where the papers to be printed are passed over what are called turnover bar assemblies, so that the paper to be printed within one printing-machine pass can be printed first on the front side with a multiplicity of print applicators and then also printed on the reverse side with a multiplicity of print applicators. The turnover bar assemblies usually have air nozzles which prevent friction, rubbing, and a buildup of pressure between the rolls of the turnover bar assemblies and the paper being printed. This technology is indeed sufficient for lightweight papers, but, for heat-sensitive recording materials with relatively high masses per unit area, pressure, friction, and rubbing in the turnover bar assemblies result in instances of discoloration in the recording layers. Limitations of this kind are unacceptable for the customers issuing tickets and entry cards.

SUMMARY OF THE INVENTION

Following intense considerations and experiments, some of which were also unsuccessful and very disappointing, the inventors recognized that the problems identified above can be solved quite outstandingly by the provision to the public of a new heat-sensitive recording material

- having a web-shaped substrate (1), having a front side and a reverse side opposite the front side,
- having a heat-sensitive recording layer (3) disposed at least on one of the two sides of the web-shaped substrate (1),
- this heat-sensitive recording layer (3) comprising at least one dye precursor and at least one (color) developer that is reactive with this at least one dye precursor,
- and where the new heat-sensitive recording material is disposed at least on one of the two sides of the substrate (1) comprises particles (4) having an organic surface whose extent in the direction of the thickness of web-shaped substrate (1) and heat-sensitive recording layer (3) is greater than the thickness of the heat-sensitive recording layer (3).

In the further course of the present description, the web-shaped substrate (1), the heat-sensitive recording layer (3), and the particles (4) with organic surface will not be numbered unless such numbering appears absolutely necessary in order to make the disclosure clear.

The particles having the organic surface that are incorporated in the heat-sensitive recording layer act as spacers between the heat-sensitive recording layer and the rolls of the turnover bar assemblies in the offset printing machines, and, as a result of their formation of a bump-like surface of the heat-sensitive recording layer, at least toward the thermal head, they effectively prevent discolorations in the respective recording layer owing to one or more of pressure, friction, and rubbing. With regard to the bump-like surface of the heat-sensitive recording layer of the recording material of the invention, the elevations, which protrude in a domelike manner toward the thermal head from the otherwise flat heat-sensitive recording layer—such elevations being referred to here as bumps—are formed by the particles having the organic surface. In accordance with the results of numerous experiments conducted in advance of and as part of this invention, it is sufficient for the particles with organic surface to be incorporated into the heat-sensitive recording layer preferably in an amount of between 0.1 wt % and 1.0 wt %, especially preferably in an amount of between 0.1 wt % and 0.5 wt %, based on the total weight of the fully formed heat-sensitive recording layer.

From the known prior art to be considered here, the incorporation of particles with organic surface, which protrude from the layers containing them, is known in principle. Thus, for example, DE 38 28 731 A1 proposes a heat-sensitive recording material having a protective layer, the protective layer comprising polyethylene wax particles having a particle size of 3 µm to 10 µm in a polymeric surround—formed, for example, from polyvinyl alcohol. The protective layer thus designed is intended to prevent the attachment of dirt to the thermal head and the sticking of the recording material.

Known from JP 1995 314 895 A is the incorporation of—with an order of magnitude of 0.1 µm to 2 µm—very small polyolefin particles, which on that basis already are not protruding, into the protective layer of a heat-sensitive recording material. The intention here is that the incorporation of the polyolefin particles into the protective layer should serve to reduce the gloss of the recording material known accordingly.

In both specifications discussed above, the particles with organic surface are incorporated into the protective layer, which in the context of the presently proposed recording material in the present specification is something rather to be avoided as discussed below. In both cases of the prior art as discussed here the incorporation of the particles does not serve to improve the offset-printability of heat-sensitive recording materials particularly with relatively high masses per unit area.

It is advantageous if the heat-sensitive recording material, at least on the side having the heat-sensitive recording layer on its surface, is extremely flat and smooth, so that the heat-sensitive recording material can be conveyed past the thermal head with as little distance as possible. The incorporation of the particles with organic surface then increases this distance between thermal head and surface of the heat-sensitive recording material, owing to their protrusion from the heat-sensitive recording layer, and for this reason it is sensible to compensate the reduced responsiveness, caused by the increased distance, of the heat-sensitive recording layer to the external heat supplied in order to form a visually perceptible printed image, by measures that promise optimization of the sensitivity of the heat-sensitive recording material proposed. Such measures are considered generally to be preferred and are elucidated in more detail in the further course of the present specification.

According to one aspect of the invention, the particles to be incorporated into the heat-sensitive recording layer feature an organic surface. The purpose of this organic surface is to protect the thermal head when the proposed heat-sensitive recording material is utilized in a thermal printer. Tests with heat-sensitive recording materials having, for example, inorganic pigments in their recording layers whose extent in the direction of the thickness of web-shaped substrate and heat-sensitive recording layer is greater than the thickness of the heat-sensitive recording layer caused scratching to the surface of the thermal heads, and consequently such proposals are unsuitable for solving the problems explained and to be solved, and must be declined.

As the result of numerous tests, it was found that the optimum extent of the particles (4) with organic surface in the direction of the thickness of web-shaped substrate (1) and heat-sensitive recording layer (3) is in a range from 0.5 µm to 4.0 µm or, more precisely, in a range from 0.5 µm to 2.0 µm greater than the thickness of the heat-sensitive recording layer (3) in which these particles (4) are incorporated, and consequently an extent of this kind is considered to be preferred. This means that the particles protrude in a domelike manner toward the thermal head in a preferred range from 0.5 µm to 4.0 µm and very preferably in a range from 0.5 µm to 2.0 µm from the otherwise flat heat-sensitive recording layer. If, for example, the mass per unit area of the heat-sensitive recording layer is then 3 g/m², corresponding in a first approximation to a thickness of 3.0 µm, the particles with organic surface are to have a diameter—in the context of the especially preferred version and in the case of a beadlike form—in a range from 3.5 µm $(=3.0\ \mu m_{thickness\ of\ the\ recording\ layer}+0.5\ \mu m_{domelike\ protrusion\ of\ the\ particles\ at\ minimum})$ to 5.0 µm $(=3.0\ \mu m_{thickness\ of\ the\ recording\ layer}+2.0\ \mu m_{domelike\ protrusion\ of\ the\ particles\ at\ maximum})$. If the mass per unit area of the heat-sensitive recording layer is 1.5 g/m², corresponding in a first approximation to a thickness of 1.5 µm, the particles with organic surface are to have a diameter—in the context of the especially preferred version and in the case of a beadlike form—in a range from 2.0 µm to 3.5 µm.

Despite the fact that, for example, ellipse-like forms are conceivable for the particles (4) with organic surface, their beadlike form is considered to be particularly preferred in the sense of the present invention. At the same time, it is preferred on the part of the inventorship if the particles (4) with organic surface that are incorporated into the heat-sensitive recording layer (3) all have an equal extent, i.e., in the case of the preferred beadlike form, they all have an equal diameter. This ensures, in the case of the bump-like surface of the heat-sensitive recording layer, that, rising up from the otherwise flat heat-sensitive recording layer, there can be no structures composed of larger and smaller elevations protruding in a domelike manner, either structures perceptible on a tactile basis or visually, and formed in random distribution.

There are, in principle, numerous forms of embodiments for the particles (4) with organic surface that are conceivable and possible; particularly convincing in the tests on which this specification is based were those forms of embodiment selected from the list encompassing:
  microcapsules, especially air- and/or water-filled microcapsules with, for example, melamine-formaldehyde-based walls,
  starch beads,
  polyacrylate beads,
  styrene acrylate beads, and
  spherical particles of polyolefin.

For the production of air-filled microcapsules it is possible, for example, to add a suitable surfactant in order to stabilize hydrophobic air in hydrophilic water and subsequently to add the desired wall material, based for example on melamine-formaldehyde, for encapsulation. In numerous tests, working examples of the heat-sensitive recording material presented here
  with air-filled microcapsules and walls based on melamine-formaldehyde,
  but equally other air-filled and/or water-filled microcapsules, encapsulated by the encapsulating techniques customary and known in the prior art, were able to give a particularly good account of themselves as the particles with organic surface incorporated into the recording layer in accordance with one aspect of the invention.

In the case of the abovementioned beads of starch, polyacrylate, and styrene acrylate, implemented preferably in solid form, but also, conceivably, with a core of included gas, it was possible to carry out successful tests as part of the precursor studies to this specification. Likewise successfully it was possible to carry out tests with spherical polyolefin particles. Here it emerged that the polyolefin-based wax beads do not melt in the offset printing machines and act, as desired, as spacers. Under the influence of the heat of a thermal head, however, such wax beads do melt, and so here, in particular, the use of pigments with maximum oil absorption, at least in an amount that is still just sufficient, within the heat-sensitive recording layer, is of great importance, on the one hand in order to prevent print head deposits and on the other hand in order to ensure sufficient sensitivity of the recording layer with respect to the heat of the thermal head. At the same time, however, it was also observed that wax beads with different constructions were occasionally less convincing, on account of their excessive hardness or else, often, on account of their excessively low melting point.

Especially for improving the sensitivity of the heat-sensitive recording material proposed here, this innovative recording material preferably has an interlayer (2) that comprises hollow pigments and is positioned between the web-shaped substrate (1) and the at least one heat-sensitive recording layer (3). The reason for the great importance of the organic hollow pigments in the interlayer (2) is that such organic pigments are particularly beneficial to a high heat reflection capacity on the part of the interlayer (2). The hollow pigments have air in their interior, which represents a good thermal insulator. The interlayer (2) optimized accordingly as a heat reflection layer thus quite specifically increases the responsiveness of the recording layer (3) with respect to heat.

In the further course of the present description, the web-shaped substrate (1), the interlayer (2), the heat-sensitive recording layer (3), and the particles (4) with organic surface will not be numbered, unless such numbering appears absolutely necessary in order to make the disclosure clear.

Besides the organic pigments, the interlayer preferably comprises inorganic pigments selected individually or in combination with one another from the list encompassing: calcined kaolin, silicon oxide, bentonite, calcium carbonate, aluminum oxide, and particularly boehmite. The thermal head, which in the heat-sensitive recording layer initiates the color-forming reaction of the dye precursors with the (color) developers, causes melting of wax-like constituents in the recording layer. The inorganic pigments incorporated preferably in the interlayer also have the effect of absorption of this melt. It is particularly advantageous here if the pigments of the interlayer have an oil absorption of at least 80 $cm^3$/100 g and better still of 100 $cm^3$/100 g, determined according to the Japanese standard JIS K 5101. This requirement is met by the inorganic pigments designated above.

The proportion between the entirety of organic pigments and the entirety of inorganic pigments within the interlayer is a compromise between the effects produced by the two pigment types, this compromise being resolved to particular advantage if the pigment mixture consists to an extent of 5 to 30 wt % or, better still, 8 to 20 wt % of organic pigment and to an extent of 95 to 70 wt % or, better still, 92 to 80 wt % of inorganic pigment. Pigment mixtures of different organic and/or of different inorganic pigments are conceivable.

Besides the inorganic and optionally also organic pigments, the interlayer comprises at least one binder, preferably based on a synthetic polymer, with styrene-butadiene latex, for example, affording particularly good results. The use of a synthetic binder with admixture of at least one natural polymer, such as starch with particular preference, represents a particularly suitable embodiment. In the course of tests with various organic and inorganic pigments it was additionally found that a binder-pigment ratio within the interlayer of between 3:7 and 1:9, based in each case on weight %, gives a particularly suitable embodiment.

A pre-prepared colored coating slip for forming the interlayer is preferably applied by a leveling coating technique selected from the list encompassing: roll coater, knife coater, or (roller) blade coater. Especially when using one of these stated coating techniques, the interlayer is able to make a positive contribution to the leveling of the substrate surface, thereby reducing the amount of material to be applied in order to form the heat-sensitive recording layer. Subsequent drying of the colored coating slip to form the interlayer is customarily accomplished by supply of heat, as by hot air flotation dryers or contact dryers. Also well established is a combination of hot air flotation dryer and contact dryer. For the mass per unit area of the interlayer, a preferred range of between 5 and 20 g/$m^2$ and more preferably still between 7 and 12 g/$m^2$ has proven appropriate.

Dye precursors in the heat-sensitive recording layer within the heat-sensitive recording material proposed here are preferably those selected from the list encompassing: 3-diethylamino-6-methyl-7-anilinofluoran, 3-dibutylamino-6-methyl-7-anilinofluoran, 3-(N-methyl-N-propyl)amino-6-methyl-7-anilinofluoran, 3-(N-ethyl-N-isoamyl)amino-6-methyl-7-anilinofluoran, 3-(N-methyl-N-cyclohexyl)amino-6-methyl-7-anilinofluoran, 3-(N-ethyl-N-tolyl)amino-6-methyl-7-anilinofluoran, and 3-(N-ethyl-N-tetrahydrofuryl)amino-6-methyl-7-anilinofluoran. Especially preferred here is 3-dibutylamino-6-methyl-7-anilinofluoran—also known as ODB-2.

It is generally also possible for the heat-sensitive recording layer to comprise more than one dye precursor, in each case selected from the dye precursors listed in the paragraph above.

The heat-sensitive recording material proposed here may comprise within the heat-sensitive recording layer, in addition to or alternatively to the substances stated as dye precursors in the paragraph before last, one or more of the following compounds which absorb in the near infrared region:

3,6-Bis(dimethylamino)fluoren-9-spiro-3'-(6'-dimethylaminophthalide), 3-diethyl-amino-6-dimethylaminofluoren-9-spiro-3'-(6'-dimethylaminophthalide), 3,6-bis(diethylamino)fluoren-9-spiro-3'-(6'-dimethylaminophthalide), 3-dibutylamino-6-dimethylamino-fluoren-9-spiro-3'-(6'-dimethylaminophthalide), 3-dibutylamino-6-diethylaminofluoren-9-spiro-3'-(6'-dimethylaminophthalide), 3,6-bis(dimethylamino)fluoren-9-spiro-3'-(6'-diethylaminophthalide), 3-diethylamino-6-dimethylaminofluoren-9-spiro-3'-(6'-diethylamino-phthalide), 3-dibutylamino-6-dimethylaminofluoren-9-spiro-3'-(6'-diethylaminophthalide), 3,6-bis(diethylamino)fluoren-9-spiro-3'-(6'-diethylaminophthalide), 3,6-bis(dimethylamino)fluoren-9-spiro-3'-(6'-dibutylaminophthalide), 3-dibutylamino-6-diethylaminofluoren-9-spiro-3'-(6'-diethylaminophthalide), 3-diethylamino-6-dimethylaminofluoren-9-spiro-3'-(6'-dibutylaminophthalide), 3,3-bis[2-(4-dimethylaminophenyl)-2-(4-methoxyphenyl)ethenyl]-4,5,6,7-tetrachlorophthalide.

The heat-sensitive recording layer of the heat-sensitive recording material proposed here comprises as (color) developer very preferably 4-[(4-(1-methylethoxy)phenyl)sulfonyl]phenol—also known as D8. Besides this especially preferred (color) developer, the heat-sensitive recording layer may also comprise, alternatively or additionally, one or more (color) developers selected from the list encompassing: N-(p-toluenesulfonyl)-N'-3-(p-toluenesulfonyloxyphenyl)urea—also known as Pergafast® 201,
diisopropyldiphenol,
4,4-sulfonyldiphenol, and
N-[2-(3-phenylureido)phenyl]benzenesulfonamide.

The heat-sensitive recording layer of the heat-sensitive recording material proposed here may comprise, for the purpose of improving the sensitivity, in one preferred embodiment, at least one sensitizer selected from the list encompassing:
- 1,2-di(phenoxy)ethane—also known as EGPE,
- 1,2-di(3-methylphenoxy)ethane—also known as EGTE,
- benzyl naphthyl ether,
- diphenyl sulfone,
- dimethyl terephthalate, and
- di(p-methylbenzyl) oxalate.

The abovementioned sensitizers are used preferably alone, in other words not in combination with the other stated sensitizers from the list above, without any intention to do without such a combination in the sense of the present invention. Of the six stated sensitizers, 1,2-di(phenoxy)ethane is considered to be especially preferred.

In numerous tests it has emerged that a ratio based on the wt % within the heat-sensitive recording layer and expressed as dye precursor$_{total}$:sensitizer$_{total}$ is situated preferably in a range from 1:0.5 to 1:2, and very preferably in a range from 1:0.8 to 1:1.4.

Suitable binders for incorporation into the heat-sensitive recording layer are, in particular,
- polyvinyl alcohol,
- polyvinyl alcohol copolymers,
  - modified polyvinyl alcohols, especially: carboxyl group-modified or silanol-modified polyvinyl alcohols,
  - water-insoluble latex binders such as:
    - styrene-butadiene copolymers,
    - acrylate copolymers, in particular:
    - acrylonitrile-butyl acrylate-methacrylate copolymers, and
    - methyl acrylate-methacrylamide copolymers, it being possible for the stated binders to be used alone or in combination with one another. Especially preferred binder in the sense of the present invention here is the combination of acrylonitrile-butyl acrylate-methacrylate copolymers and methyl acrylate-methacrylamide copolymers. The fraction of binder in the heat-sensitive recording layer, based on the total weight of the heat-sensitive recording layer, is preferably in a range from 10 to 20 wt %.

Besides the components incorporated in accordance with the invention and optionally, and identified hitherto, the heat-sensitive recording layer may further comprise pigments, preferably inorganic pigments such as, for example, aluminum (hydr)oxide, calcium carbonate, and also silicon dioxide (silica), where here in particular the combination of aluminum hydroxide and silica, to be incorporated in the heat-sensitive recording layer preferably in an amount of 25 to 50 wt %, is considered preferred insofar as particular value has been placed on oil absorption capacity in the heat-sensitive recording layer.

The heat-sensitive recording layer is preferably applied by a coating technique selected from the list encompassing: roller blade coater, knife coater, curtain coater, or airbrush. The colored coating slip used to form the recording layer is preferably aqueous. Subsequent drying of this colored coating slip is accomplished customarily by a method involving supply of heat, as by hot air flotation dryers or contact dryers. A combination of the drying methods recited is also appropriate. The mass per unit area of the heat-sensitive recording layer is preferably between 2 and 6 g/m$^2$ and better still between 2.2 and 4.8 g/m$^2$.

In accordance with observations above, the particles with organic surface that are incorporated into the heat-sensitive recording layer protrude in a domelike manner toward the thermal head, in an especially preferred range from 0.5 μm to 2.0 μm, from the otherwise flat heat-sensitive recording layer. The particles incorporated into the heat-sensitive recording layer here produce a bump-like surface of the recording material of the invention, which serves to protect the recording layer from pressure and friction, particularly in offset printing machines. Against this background it is obvious—for reasons not least of cost—that, in one particularly preferred embodiment of the heat-sensitive recording material proposed here, the at least one heat-sensitive recording layer covers over the heat-sensitive recording material toward the outside. A particularly preferred embodiment of this kind, however, does not rule out the respective formation of a protective layer over the at least one heat-sensitive recording layer. If it is nevertheless desired in spite of economic considerations, in order, for example, to bring about a strongly pronounced insensitivity toward solvents, it is then preferred for it to be formed by means of coating techniques which produce a contour coating, such as curtain coater or airbrush, for example. In that case, the particles incorporated into the heat-sensitive recording layer are merely provided with a further coating, and the fully formed recording material also outwardly has a bump-like surface.

As already observed when formulating the problem situation, a difficulty in particular is that of processing heat-sensitive recording materials having relatively high masses per unit area in printing machines with turnover bar assemblies. Consequently, in one particularly preferred embodiment of the heat-sensitive recording material proposed here, the web-shaped substrate of this material has a mass per unit area in a range from 100 g/m$^2$ to 250 g/m$^2$, without doubt, but is not limited to this range. Particularly preferred material for the web-shaped substrate is paper, and more specifically a coating basepaper which has not been surface-treated. A coating basepaper which has not been surface-treated refers to a coating basepaper not treated in a sizing press or in a coating apparatus. Also possible as web-shaped substrates of the invention are films made of polypropylene, polyolefin, and polyolefin-coated papers, for example, without any such recitation being exclusive in nature.

In principle, and especially in the context of the intended and especially preferred use of the heat-sensitive recording material proposed here, in all of its embodiments and versions identified here, as an entry card and/or flight ticket, it is the case that the heat-sensitive recording material proposed here has only on one side of the web-shaped substrate
- an optional interlayer comprising hollow pigments,
- and also a heat-sensitive recording layer comprising
  - at least one dye precursor and
  - at least one (color) developer which is reactive with this at least one dye precursor, and also
  - particles with an organic surface, in accordance with the invention.

In addition to a protective layer already mentioned as a possibility, covering over the heat-sensitive recording layer, a recording material of this kind may, additionally, also have a reverse-side coating for the purpose, for example, of improved reverse-side offset printing.

Also possible for the purposes of the present invention is for the heat-sensitive recording material proposed here to have on both sides of the web-shaped substrate, in each case, an optional interlayer comprising hollow pigments, and also a heat-sensitive recording layer comprising
  at least one dye precursor and
  at least one (color) developer which is reactive with this at least one dye precursor, and also
  particles with an organic surface, in accordance with the invention.

The details given in the description and the claims in relation to the mass per unit area, to wt % (weight %), and to parts by weight refer in each case to the "bone dry" weight, i.e., absolutely dry parts by weight. In the observations concerning the organic pigments in the pigment-containing interlayer, the relevant numerical details are calculated from the "air dry" weight, i.e., air-dry parts by weight, minus the weight fraction of water within and around the pigments in their as-supplied form.

BRIEF DESCRIPTION OF THE DRAWINGS

The FIGURE is a schematic depiction of a heat sensitive recording material

DETAILED DESCRIPTION OF THE PRESENTLY PREFERRED EMBODIMENTS

The fundamental structure of the heat-sensitive recording material proposed here is further elucidated using the FIGURE.

On a web-shaped substrate (1), formed in particular of paper with a mass per unit area in a preferred range from 100 g/m² to 250 g/m², is an interlayer (2), which preferably comprises a combination of organic and inorganic pigments and which, with a mass per unit area in a preferred range from 5 g/m² to 20 g/m², is able to make a positive contribution to leveling the substrate surface at the top toward the heat-sensitive recording layer (3). This heat-sensitive recording layer (3) is situated on the interlayer (2) and has a mass per unit area in a preferred range from 2 g/m² to 6 g/m², corresponding in a first approximation to a thickness in a range from 2 μm to 6 μm. Incorporated into this heat-sensitive recording layer (3) there are spherical particles (4) having an organic surface, the extent of which in the direction of the thickness of web-shaped substrate (1) and heat-sensitive recording layer (3) is greater than the thickness of the heat-sensitive recording layer (3). The FIGURE clearly shows how the particles (4) protrude in a bumplike manner from the otherwise flat heat-sensitive recording layer (3), the protrusion being preferably within a range from 0.5 μm to 4.0 μm.

The invention is to be elucidated in more detail with reference to the following two inventive examples and the one comparative example:

A base paper with a mass per unit area of 140 g/m² is produced as web-shaped substrate on a Fourdrinier paper machine from bleached and ground softwood and hardwood pulps with addition of 0.6 wt % (bone dry) of resin size, based on the total solids content (bone dry) of the pulp supplied to the paper machine, and also with addition of further customary adjuvants. On-line within the paper machine, this web-shaped substrate is provided on the front side, by a coating knife applicator, with an interlayer of 9 g/m², which fully covers over the web-shaped substrate. The interlayer comprises a pigment mixture of 18 wt % (bone dry) of organic pigment having a particle size (D50) of 1 μm and 82 wt % (bone dry) of calcined kaolin having a particle size (D50) of 0.9 μm and an oil absorption of 110 cm³/100 g. The organic pigment has a glass transition FIGURE of 105° C. The interlayer further comprises a binder mixture of 75 wt % of styrene-butadiene latex and 25 wt % of starch. The interlayer is dried by contact drying through a multiplicity of drying cylinders.

To form samples of the inventive 1st example, a heat-sensitive recording layer having a thickness after drying of 3.0 μm is applied to the interlayer in a separate coating machine, using a roller blade applicator, the heat-sensitive recording layer being formed using the following formulation as per table 1. Final drying of the heat-sensitive recording layer is accomplished by a combination of a multiplicity of drying cylinders in a drying section assigned to the coating machine used, with the recording material along with web-shaped substrate, interlayer, and heat-sensitive recording layer being passed meanderingly through this drying section, and of a plurality of hot air flotation dyers.

TABLE 1

|  | Component | Tradename | Wt % (bone dry) |
|---|---|---|---|
| Dye precursor | 3-dibutylamino-6-methyl-7-anilinofluoran | ODB-2 | 5.8 |
| (Color) developer | 4-[(4-(1-methylethoxy)phenyl)-sulfonyl]phenol | D8 | 19.0 |
| Sensitizer | 1,2-di(phenoxy)ethane | EGPE | 9.4 |
| Particles with organic surface (spherical, average diameter: 4.5 μm) | Air-filled microcapsules with melamine-formaldehyde-based walls | — | 0.5 |
| Binder | Combination of acrylonitrile-butyl acrylate-methacrylate copolymers and methyl acrylate-methacrylamide copolymers polyvinyl alcohol | —<br>Mowiol 15-99 | 10.0<br>10.0 |
| Inorganic pigment | Calcium carbonate | Socal P3 | 41.0 |

To form samples of the inventive 2nd example, a heat-sensitive recording layer having a thickness after drying of 2.5 μm is applied to the interlayer in a separate coating machine, using a roller blade applicator, the heat-sensitive recording layer being formed using the following formulation as per table 2. Final drying of the heat-sensitive recording layer is accomplished by a combination of a multiplicity of drying cylinders in a drying section assigned to the coating machine used, with the recording material along with web-shaped substrate, interlayer, and heat-sensitive recording layer being passed meanderingly through this drying section, and of a plurality of hot air flotation dyers.

TABLE 2

| | Component | Tradename | Wt % (bone dry) |
|---|---|---|---|
| Dye precursor | 3-dibutylamino-6-methyl-7-anilinofluoran | ODB-2 | 6.3 |
| (Color) developer | 4-[(4-(1-methylethoxy)phenyl)-sulfonyl]phenol | D8 | 19.2 |
| Sensitizer | 1,2-di(phenoxy)ethane | EGPE | 8.4 |
| Particles with organic surface (spherical, average diameter: 4 μm) | Spherical polyolefin particles | — | 0.5 |
| Binder | Combination of acrylonitrile-butyl acrylate-methacrylate copolymers and methyl acrylate-methacrylamide copolymers | — | 14.0 |
| | polyvinyl alcohol | Mowiol 15-99 | 5.0 |
| Inorganic pigment | Combination of aluminum hydroxide and silica | Martifin OL 107 Sipernat 350 | 42.0 |

To form samples of the comparative example, a heat-sensitive recording layer having a thickness after drying of 2.5 μm is applied to the interlayer in a separate coating machine, using a roller blade applicator, the heat-sensitive recording layer being formed using the following formulation as per table 3. Final drying of the heat-sensitive recording layer is accomplished by a combination of a multiplicity of drying cylinders in a drying section assigned to the coating machine used, with the recording material along with web-shaped substrate, interlayer, and heat-sensitive recording layer being passed meanderingly through this drying section, and of a plurality of hot air flotation dyers.

TABLE 3

| | Component | Tradename | Wt % (bone dry) |
|---|---|---|---|
| Dye precursor | 3-dibutylamino-6-methyl-7-anilinofluoran | ODB-2 | 6.2 |
| (Color) developer | 4-[(4-(1-methylethoxy)phenyl)-sulfonyl]phenol | D8 | 16.4 |
| Sensitizer | 1,2-di(phenoxy)ethane | EGPE | 7.0 |
| Binder | Combination of acrylonitrile-butyl acrylate-methacrylate copolymers and methyl acrylate-methacrylamide copolymers | Mowiol 15-99 | 13.6 |
| | polyvinyl alcohol | | 2.3 |
| Inorganic pigment | Combination of aluminum hydroxide and silica | Martifin OL 107 Sipernat 350 | 46.0 |

After the samples have been readied, black and white checkered thermal test printouts are produced on each of the samples using an Atlantek 400 instrument from Printrex (USA), employing a thermal head with resolution of 300 dpi and an energy per unit area of 16 mJ/mm$^2$. The specimens thus processed are subsequently first viewed under a scanning electron microscope, in order to assess the behavior of the samples of inventive examples 1 and 2 under the heat of a thermal head. Here it is found that the elevations protruding in a domelike manner from the otherwise flat heat-sensitive recording layer—referred to here as bumps—, formed in the inventive 1st example by air-filled microcapsules, very largely retain their original form without restriction, under the influence of a heat-emitting thermal head, and therefore continue to protrude as they originally did from the heat-sensitive recording layer. As expected, the spherical polyolefin particles according to the inventive 2nd example are slightly and partially melted, but also still protrude significantly as elevations from the otherwise flat recording layer.

On subsequent printing, these findings are further confirmed: the printing, and particularly the passage through the turnover bar assemblies within the offset printing machines employed, are completely unproblematic in the case of the samples of inventive examples 1 and 2; in particular, on passage through the turnover bar assemblies, there are no instances at all of discoloration in the recording layers. This was exactly the objective of the invention, and can exactly be achieved with absolute conviction with heat-sensitive recording materials in accordance with the present invention—in contrast to recording materials from the known prior art having relatively high masses per unit area and having heat-sensitive recording layers without the particles with organic surface, as represented here by the samples of the comparative example: these samples exhibit distinct discolorations in the recording layer, owing to pressure, friction, and rubbing in the turnover bar assemblies of the offset printing machines employed.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A heat-sensitive recording material configure for offset printing, comprising:
   a web-shaped substrate, having a front side and a reverse side opposite the front side; and
   a heat-sensitive recording layer disposed at least on one of the two sides of the web-shaped substrate, comprising:
      at least one dye precursor;
      at least one (color) developer reactive with the at least one dye precursor; and
      particles having an organic surface whose extent in a direction of a thickness of the web-shaped substrate and the heat-sensitive recording layer is greater than a thickness of the heat-sensitive recording layer,
   wherein the particles are selected from the group consisting of:
      microcapsules filled with air and/or water,
      polyacrylate beads,
      styrene acrylate beads, and
      spherical particles of polyolefin.

2. The heat-sensitive recording material as claimed in claim 1, wherein the extent of the particles is from 0.5 µm to 2.0 µm greater than the thickness of the heat-sensitive recording layer.

3. The heat-sensitive recording material as claimed in claim 1, wherein the particles have a beadlike form.

4. The heat-sensitive recording material as claimed in claim 3, wherein the particles that are incorporated into the heat-sensitive recording layer have an equal diameter.

5. The heat-sensitive recording material as claimed in claim 4, wherein the particles are air-filled microcapsules with melamine-formaldehyde-based walls.

6. The heat-sensitive recording material as claimed in claim 1, wherein the particles that are incorporated into the heat-sensitive recording layer have a beadlike form and an equal diameter.

7. The heat-sensitive recording material as claimed in claim 1, wherein the particles are air-filled microcapsules with melamine-formaldehyde-based walls.

8. The heat-sensitive recording material as claimed in claim 1, wherein the heat-sensitive recording material has an interlayer that comprises hollow pigments and is positioned between the web-shaped substrate and the at least one heat-sensitive recording layer.

9. The heat-sensitive recording material as claimed in claim 8, wherein the at least one heat-sensitive recording layer is an outer layer of the heat-sensitive recording material.

10. The heat-sensitive recording material as claimed in claim 1, wherein the at least one heat-sensitive recording layer is an outer layer of the heat-sensitive recording material.

11. The heat-sensitive recording material as claimed in claim 1, wherein the heat-sensitive recording layer comprises at least one (color) developer selected from the group consisting of:
   4-[(4-(1-methylethoxy)phenyl)sulfonyl]phenol,
   N-(p-toluenesulfonyl)-N'-3-(p-toluenesulfonyloxyphenyl)urea,
   diisopropyldiphenol,
   4,4-sulfonyldiphenol, and
   N-[2-(3-phenylureido)phenyl]benzenesulfonamide.

12. The heat-sensitive recording material as claimed in claim 1, wherein the heat-sensitive recording layer comprises 3-dibutylamino-6-methyl-7-anilinofluoran as the at least one dye precursor.

13. The heat-sensitive recording material as claimed in claim 1, wherein the heat-sensitive recording layer further comprises at least one sensitizer selected from the group consisting of:
   1,2-di(phenoxy)ethane,
   1,2-di(3-methylphenoxy)ethane,
   benzyl naphthyl ether,
   diphenyl sulfone,
   dimethyl terephthalate, and
   di(p-methylbenzyl) oxalate.

14. The heat-sensitive recording material as claimed in claim 13, wherein the heat-sensitive recording layer comprises 1,2-di(phenoxy)ethane as the at least one sensitizer.

15. The heat-sensitive recording material as claimed in claim 13, wherein the heat-sensitive recording layer further comprises at least one binder selected from the group consisting of:
   polyvinyl alcohol,
   polyvinyl alcohol copolymers,
   modified polyvinyl alcohols,
   carboxyl group-modified or silanol-modified polyvinyl alcohols,
   water-insoluble latex binders
   styrene-butadiene copolymers,
   acrylate copolymers
   acrylonitrile-butyl acrylate-methacrylate copolymers, and
   methyl acrylate-methacrylamide copolymers.

16. The heat-sensitive recording material as claimed in claim 15, wherein the web-shaped substrate has a mass per unit area in a range from 100 $g/m^2$ to 250 $g/m^2$.

17. The heat-sensitive recording material as claimed in claim 1, wherein the heat-sensitive recording layer further comprises at least one binder selected from the group consisting of:
   polyvinyl alcohol,
   polyvinyl alcohol copolymers,
   modified polyvinyl alcohols,
   carboxyl group-modified or silanol-modified polyvinyl alcohols,
   water-insoluble latex binders
   styrene-butadiene copolymers,
   acrylate copolymers,
   acrylonitrile-butyl acrylate-methacrylate copolymers, and
   methyl acrylate-methacrylamide copolymers.

18. The heat-sensitive recording material as claimed in claim 1, wherein the web-shaped substrate has a mass per unit area in a range from 100 $g/m^2$ to 250 $g/m^2$.

* * * * *